(12) United States Patent
Pedde et al.

(10) Patent No.: US 7,517,577 B2
(45) Date of Patent: Apr. 14, 2009

(54) ATTACHMENT DEVICE

(75) Inventors: Burkhard Pedde, Bruchkobel (DE); Phillipe Marenne, Stavolet (BE); Michael Hack, Bisdiofsheim (DE); Georg Heinl, Zwingenberg (DE)

(73) Assignee: Woodbridge Foam Corporation (CA)

( * ) Notice: Subject to any disclaimer, the term of this patent is extended or adjusted under 35 U.S.C. 154(b) by 0 days.

(21) Appl. No.: 11/928,627

(22) Filed: Oct. 30, 2007

(65) Prior Publication Data
US 2008/0048474 A1    Feb. 28, 2008

Related U.S. Application Data

(62) Division of application No. 10/371,204, filed on Feb. 24, 2003, now abandoned.

(60) Provisional application No. 60/358,363, filed on Feb. 22, 2002.

(51) Int. Cl.
*B32B 3/06* (2006.01)
(52) U.S. Cl. .......................... 428/99; 24/302
(58) Field of Classification Search .................. 428/99, 428/100, 223; 297/452.6, 452.13; 24/336, 24/341, 581.11, 300–302, 462, 297, 697.1, 24/298, 299
See application file for complete search history.

(56) References Cited

U.S. PATENT DOCUMENTS

| 4,470,179 A | 9/1984 | Gollin et al. |
|---|---|---|
| 4,508,220 A | 4/1985 | Pearson |
| 5,320,269 A | 6/1994 | Deschenes et al. |
| 5,388,749 A | 2/1995 | Davignon et al. |
| 5,641,552 A | 6/1997 | Tillner |
| 5,683,025 A | 11/1997 | Grendol |
| 5,896,720 A | 4/1999 | Bond |
| 6,478,209 B1 | 11/2002 | Bruins et al. |
| 6,568,761 B2 | 5/2003 | Perske et al. |
| 6,698,641 B2 | 3/2004 | Flannery et al. |
| 6,964,453 B1 | 11/2005 | Flegal et al. |
| 2002/0101109 A1 | 8/2002 | Stiller et al. |

(Continued)

FOREIGN PATENT DOCUMENTS

DE    29822649 U1    4/1994

(Continued)

OTHER PUBLICATIONS

Translation of German Patent Document 29,822,649, Mar. 2004.

(Continued)

*Primary Examiner*—Alexander Thomas
(74) *Attorney, Agent, or Firm*—Katten Muchin Rosenmann LLP

(57) ABSTRACT

A vehicular seat trim cover attachment device having a plurality of female attachment portions interconnected to one another by at least one connecting portion. The attachment device is preferably flexible in at least two independent planes. Each female attachment portion has a receptacle portion and a base portion. Each base portion is connected to the connecting portion. Each base portion has a lateral dimension greater than a lateral dimension of the receptacle portion. At least a portion of the connecting portion is disposed in an exoplanar relationship with respect to a pair of female attachment portions that have substantially coplanar base portions. Preferably, the connecting portion extends below the bottom surfaces of the adjacent base portions.

25 Claims, 8 Drawing Sheets

U.S. PATENT DOCUMENTS

| | | |
|---|---|---|
| 2002/0121538 A1 | 9/2002 | Cooper et al. |
| 2004/0205939 A1 | 10/2004 | Cooper et al. |
| 2005/0006944 A1 | 1/2005 | Ali et al. |

FOREIGN PATENT DOCUMENTS

| | | |
|---|---|---|
| DE | 19949423 C1 | 1/2001 |
| JP | 07-67478 A | 3/1995 |
| WO | 98/18991 A1 | 5/1998 |
| WO | 02/36438 A1 | 5/2002 |
| WO | 2004/012909 A2 | 2/2004 |

OTHER PUBLICATIONS

Feb. 24, 2003, invitation to Pay Additional Fees, including annex, for International Application No. PCT/CA03/00246.

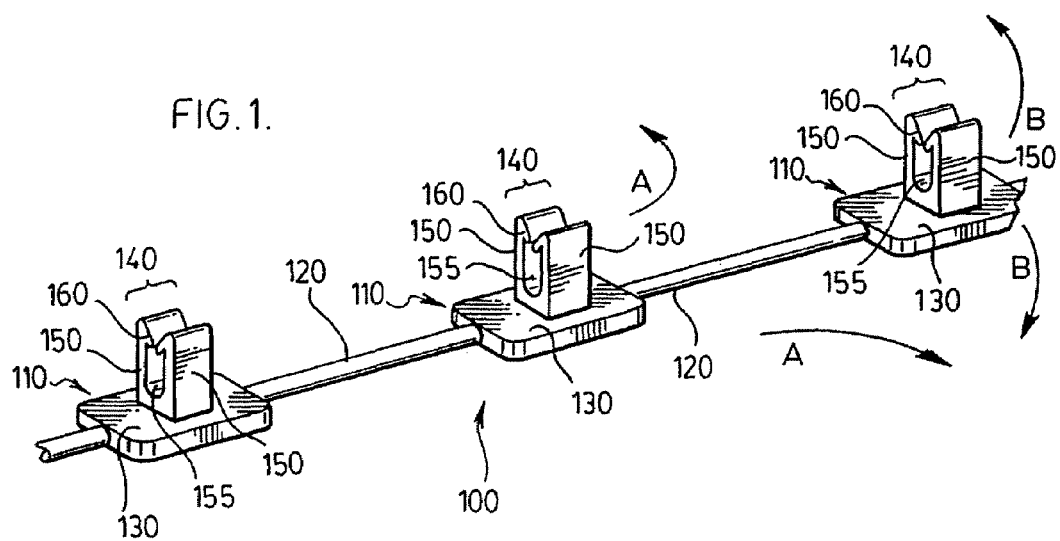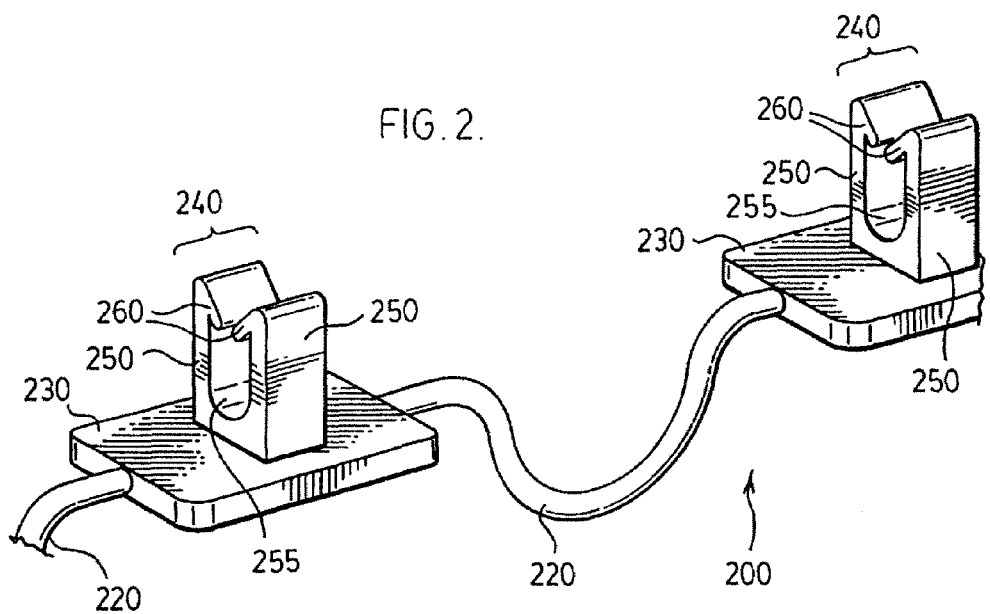

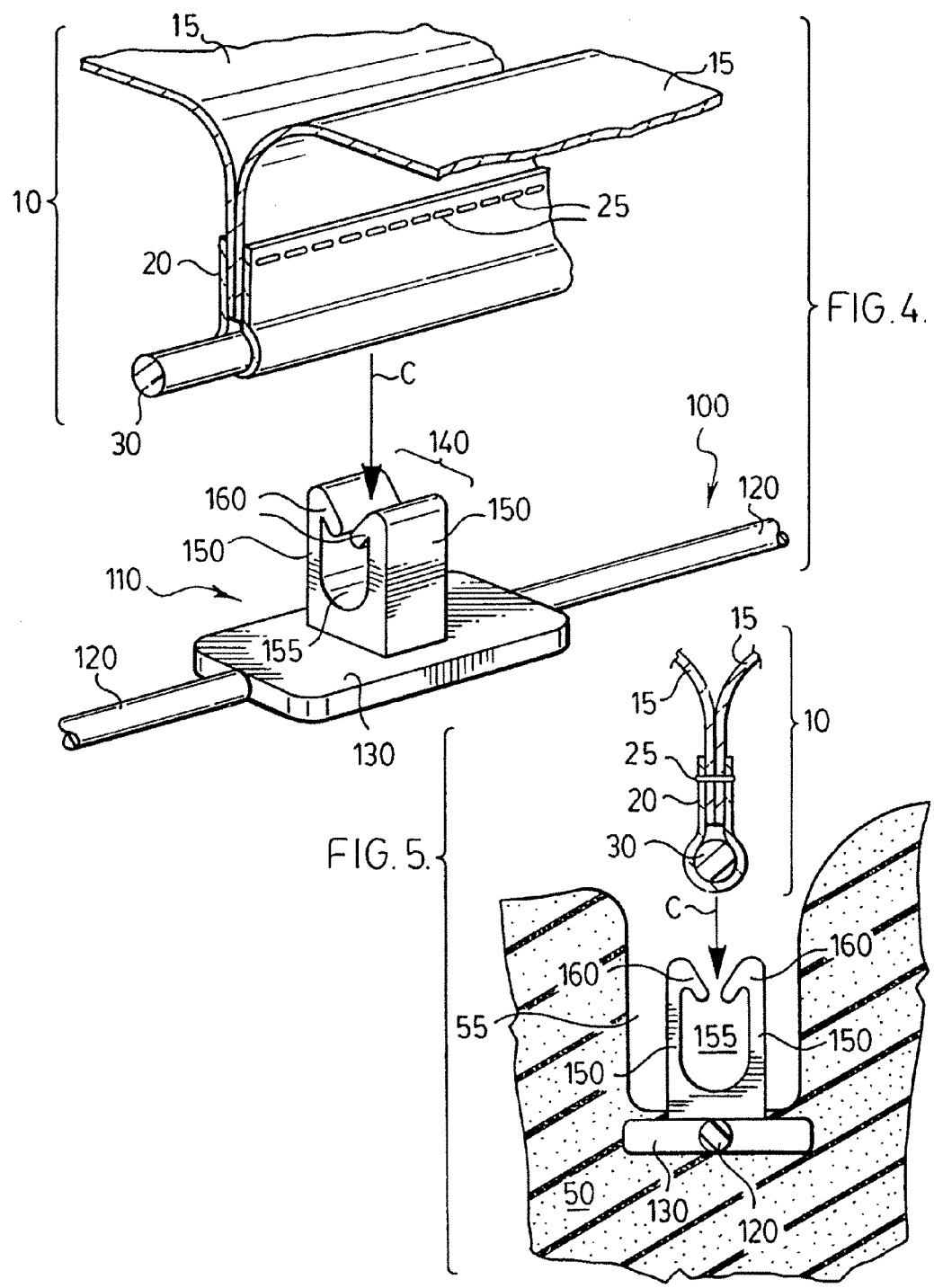

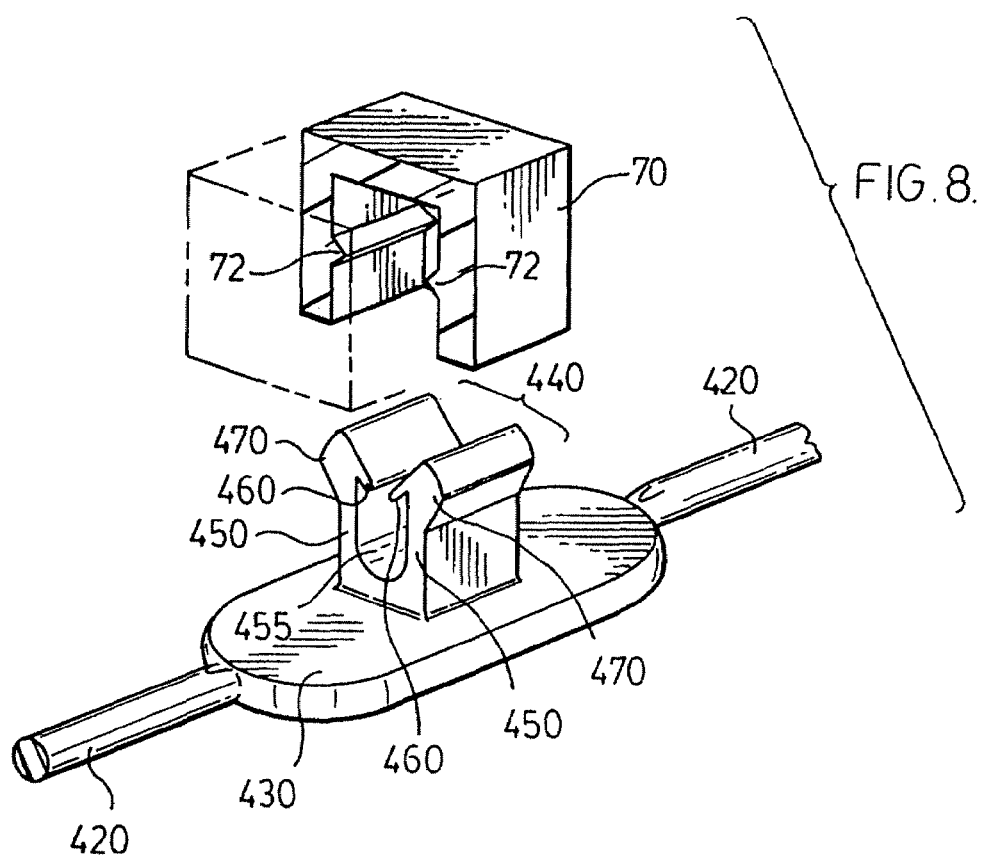
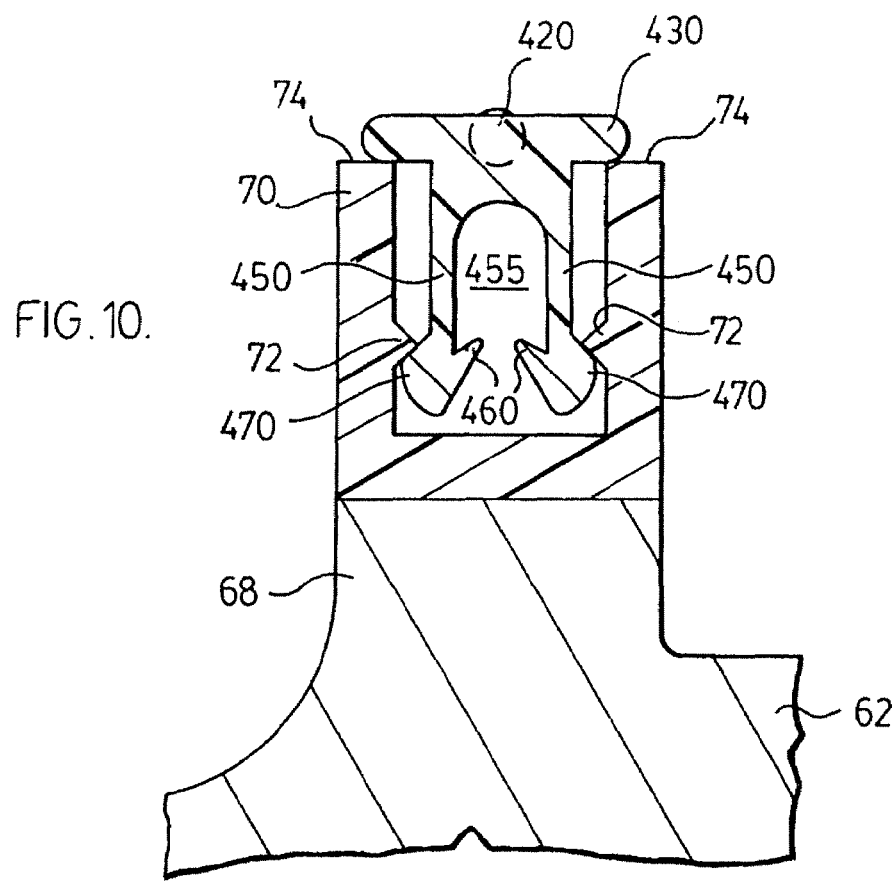

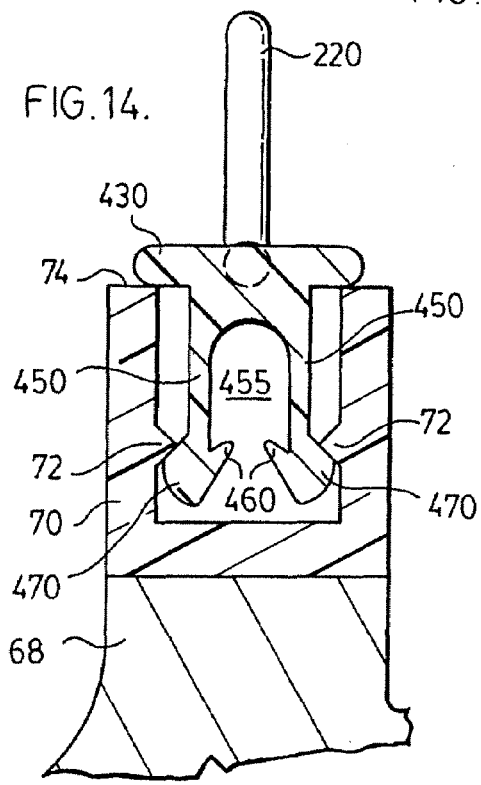
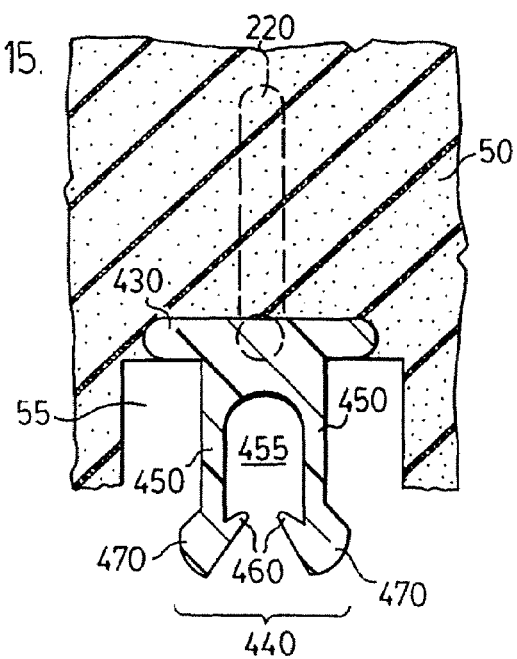
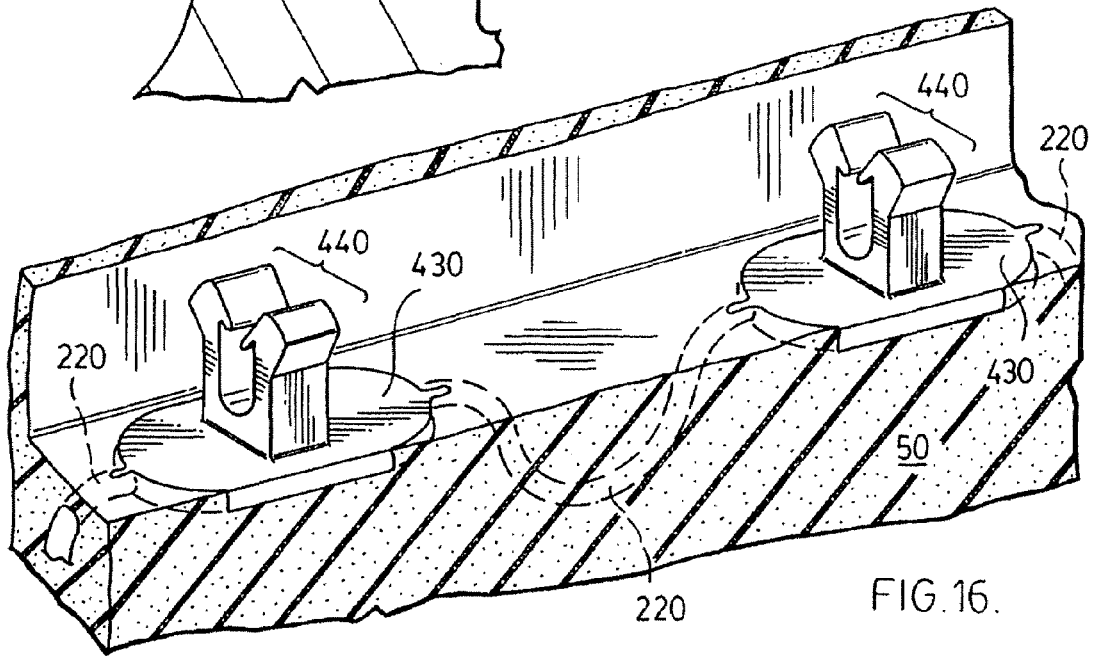

ATTACHMENT DEVICE

CROSS-REFERENCE TO RELATED APPLICATION

The present application is a divisional application of U.S. patent application Ser. No. 10/371,204, filed Feb. 24, 2003, (now abandoned), which claims the benefit under 35 U.S.C. §119(e) of U.S. Provisional Patent Application No. 60/358,363, filed Feb. 22, 2002, the contents of both of which are hereby incorporated by reference.

BACKGROUND OF THE INVENTION

1. Field of the Invention

In one of its aspects, the present invention relates to an attachment device, preferably to a trim cover attachment device. In another of its aspects, the present invention relates to a resilient device, preferably a foam device in a vehicular seat, incorporating the present attachment device, preferably for attachment of a trim cover to the foam device. In yet another of its aspects, the present invention provides a process for producing a resilient device, preferably a foam device in a vehicular seat, incorporating the present attachment device, more preferably a trim cover attachment device. In yet another of its aspects, the present invention provides a mold for producing a resilient device, preferably a foam device in a vehicular seat, incorporating the present attachment device, preferably for attachment of a trim cover to the foam device.

2. Description of the Prior Art

Attachment of a trim cover to a resilient device is generally known.

In most cases, the resilient device is a foam device, although, in some cases, a fibrous matrix such as rubberized horsehair and the like is still being employed. Typically, it is desired to secure a trim cover to a resilient device to produce a vehicular seat or a component of a vehicular seat.

There are three general categories of approaches in attachment of a trim cover to a resilient device: adhesive, foam-in-place and mechanical. The present invention relates to an improvement falling in the latter category and thus, prior art in this category will be discussed.

In the mechanical approach for attachment of a trim cover to a resilient device, there are (at least) four sub-categories. For ease of description, reference will be made to a foam device.

First, it is known in art to employ so-called "hog-rings" to secure a trim cover to a resilient device. In this approach, a metal wire is melded into the so-called A-surface of the foam device. The metal wire is exposed at selected spots, typically in a trench, on the surface of the foam device. A trim cover is provided and has a finished outer surface made of leather, cloth, vinyl or the like. Commonly attached to the underside of the trim cover is a non-woven material, a felt material and the like. A hard plastic (or other) bead is attached to the non-woven material. Of course other methods are attaching the hard plastic bead to the trim cover are used in the art. The trim cover is attached to the foam device by aligning the metal wire in the foam device with the hard plastic bead in the trim cover and thereafter engaging the two with a metal ring. Typically, the metal ring is deployed from a so-called hog-ring gun. This approach has been used for many years to secure a trim cover to a foam device. This approach suffers from a number drawbacks. For example, a significant capital cost is required to acquire the hog-ring gun and a significant associated labour cost is required to ensure that trim covers can be attached to foam devices at a rate commensurate with the rate at which the foam device is being produced. Further, since deployment of the first hog-ring immovably secures the trim cover to foam device, there is no play or give. The result of this is that perfect placement of trim cover over the foam device must be achieved prior to deployment of the first hog ring to avoid significant loss of efficiency. Still further, this approach is difficult to use reliably when producing a vehicular seat product which incorporates one or more of a seat heater and an occupant detection system. Still further, the use of metal in the foam device creates additional cost in recycling the finished product after complete of its life cycle. A modification of this approach is to replace the metal wire typically molded into the A-surface of the foam device with a mounting device made of foam—see, for example, Canada patent application 2,165,930 [Grund et al.], published on Jun. 24, 1996 and DE 44 46 450 C1 [Johnson Controls GmbH & Co.], granted Apr. 4, 1996. Another modification of this approach is to utilize a mechanical clip to connect the trim cover to the metal wire molded into the A-surface of the foam device—see, for example DE 195 30 379 C2 [Johnson Controls GmbH & Co.], published Dec. 19, 1996.

Second it is known to utilize a plurality of independent or single mechanical clips to secure the trim cover to the foam device. In this approach, a series of mechanical clips is molded in the A-surface of the foam device. Each mechanical clip typically comprises a base which is molded into the foam and a receptacle or clip portion which emerges from the foam at selected locations on the A-surface of the foam device. See, for example, one or more of the following prior art references:

DE 299 17 372 U1 [Johnson Controls GmBH & Co.], published Feb. 24, 2000; and

DE 298 21 697 U1 [Bertrand Faure Sitztechnik GmbH & Co.], published Mar. 25, 1999.

For a typical vehicular seat component (e.g., a seat bottom or a seat back), it is common to require 12-30 of these clips to be molded into the foam device. This approach suffers from a number of drawbacks. For example, it is very difficult to achieve optimal alignment of the individual clips using this approach. This results in production of an unsightly product. Further, this approach requires significant time to correctly dispose the individual clips in the mold. This results in one or both of low efficiency and increased labour.

Third, it is known to use so-called Velcro™-type fasteners to attach a trim cover to a foam device. These fasteners are also known in the art as touch fasteners or "hook and loop" fasteners. While this approach is reliable, it does suffer from a number of drawbacks. For example, the this type of fastener is generally regarded one of the most expensive approaches to utilize to secure a trim cover to a foam device. Further, this approach is not well suited to fastening around a curve portion of the foam device without incurring significant wastage. Third, in many applications, the use of this approach necessitates the use of a wide fastener to achieve sufficient pullout strength. The result of this is a relatively wide trench which results in a relatively unsightly product.

Fourth, from U.S. Pat. No. 5,641,552 [Tillner], it is known to utilize an anchoring strip which is molded in A-surface of the foam device. The anchoring strip is in the form a wide, flat connecting bar made of a molded plastic body (polypropylene is provided as an example) and having a series of C-clips disposed at various spots along its length. The wide, flat connecting bar is described as being flexible perpendicular to its main plane. It is clear that this is the only moment of flexibility of the wide, flat connecting bar. This approach has a number of drawbacks. For example, the anchoring strip is not well suited to being used around corners and, for most cost-efficient applications, is really only applicable in straight lengths. Further, if the final product is a vehicle seat, the use of a wide, flat connecting bar made of plastic deleteriously affects comfort. Still further, demolding a foam part having a wide, flat connecting bar of this an anchoring strip is difficult to achieve reliably without tearing out of a portion of the anchoring bar from the A-surface of the foam part. Still further, it is impractical and, in most cases, not possible, to mold the anchoring strip in to foam without fouling of the C-clips.

British patent application 2,238,708A [White] teaches a device for attaching material to a seat in a manner similar to the device taught by Tillner. The device is in the form of a rail having one or more clip members which form an open loop. A flat vertical connecting portion is interposed between the rail and the one or more clip members such that the clip portion and the rail are remote from one another. This approach has a number of drawbacks. First, the device taught by White is not easily useable in a commercial setting due to the fact that there is no place on the rail which provides a convenient press point for insertion of the device in a mold. In fact, White is completely silent on how the device is to be used in a mold or on a mold therefore. This disadvantage is exacerbated by the presence of the flat vertical connecting portion between the rail and the one or more clip members rendering the device cumbersome to insert in a mold. Second, the distance between the rail and the clip member(s) is too large to allow the device to be conveniently used in a process and to allow the device to be molded into many conventional dimensioned foam elements. On the latter point, for example, in a conventional vehicular seat, the thickness of the seat in the location of the trenches is about 20 to about 25 mm. This dimension renders the device taught virtually unusable as taught by White.

Thus, despite the advances made to date, there is still room for improvement. Specifically, it would be advantageous to have an attachment device which obviates or mitigates and least one of the above-mentioned drawbacks of the prior art. It would be particularly advantages if the attachment device was not only well suited for attachment of a trim cover to a resilient body but could also be use to attach other elements to the resilient body.

SUMMARY OF THE INVENTION

It is an object of the present invention to provide an attachment device, preferably a trim cover attachment device, which obviates or mitigates at least one of the above-mentioned disadvantages of the prior art.

It is another object of the present invention to provide a novel resilient device incorporating the present attachment device, more preferably a trim cover attachment device.

It is another object of the present invention to provide a novel foam device incorporating the present attachment device, more preferably a trim cover attachment device.

It is yet another object of the present invention to provide a novel process for production of the present resilient device.

It is yet another object of the present invention to provide a novel mold for production of the present resilient device.

Accordingly, in one of its objects, the present invention provides an attachment device comprising a plurality of female attachment portions interconnected to one another by at least one connecting portion, the attachment device being flexible in at least two independent planes, each female attachment portion comprising a receptacle portion and a base portion connected to the connecting portion, the base portion having a lateral dimension greater than a lateral dimension of the receptacle portion.

In another of its aspects, the present invention provides an elongate attachment device having a longitudinal axis, the device comprising:

a plurality of female attachment portions, each female attachment portion comprising a receptacle portion having a first lateral dimension substantially orthogonal to the longitudinal axis and a base portion connected to the connecting portion, the base portion having a second lateral dimension substantially orthogonal to the longitudinal axis, the second lateral dimension being greater than the first lateral dimension;

at least one elongate flexible portion interconnecting the plurality of attachment portions, the at least one elongate flexible portion having a third lateral dimension substantially orthogonal to the longitudinal axis;

wherein second lateral dimension is greater than the third lateral dimension.

In yet another of its aspects, the present invention provides a resilient device comprising a resilient body and the present attachment device secured with respect to one another.

In yet another of its aspects, the present invention provides a foam device comprising a foam body and the present attachment device secured with respect to one another.

In yet another of its aspects, the present invention provides a process for producing a foam device incorporating an attachment device comprising a plurality of female attachment portions interconnected to one another by at least one connecting portion, the attachment device being flexible in at least two independent planes, each female attachment portion comprising a receptacle portion and a base portion connected to the connecting portion, the base portion having a lateral dimension greater than a lateral dimension of the receptacle portion, the process comprising the steps of:

disposing the attachment device in a mold comprising a first mold portion and a second mold portion releasably engageable to define a mold cavity;

dispensing at least one of an expandable polymeric composition and expanded polymer particles in at least one of the first mold portion and the second mold portion;

closing the first mold portion and the second mold portion;

expanding the expandable polymeric composition or adhering the expanded polymer particles to each other to substantially fill the mold cavity and to at partially encompass at least a portion of the attachment device; and obstructing foam entry into the plurality of attachment portions.

In yet another of its aspects, the present invention provides a process for producing a foam device incorporating an elongate attachment device having a longitudinal axis, the device comprising: a plurality of female attachment portions, each female attachment portion comprising a receptacle portion having a first lateral dimension substantially orthogonal to the longitudinal axis and a base portion connected to the connecting portion, the base portion having a second lateral dimension substantially orthogonal to the longitudinal axis, the second lateral dimension being greater than the first lateral dimension; at least one elongate flexible portion interconnecting the plurality of attachment portions, the at least one elongate flexible portion having a third lateral dimension substantially orthogonal to the longitudinal axis; wherein second lateral dimension is greater than the third lateral dimension, the process comprising the steps of:

disposing the attachment device in a mold comprising a first mold portion and a second mold portion releasably engageable to define a mold cavity;

dispensing at least one of an expandable polymeric composition and expanded polymer particles in at least one of the first mold portion and the second mold portion;

closing the first mold portion and the second mold portion;

expanding the expandable polymeric composition or adhering the expanded polymer particles to each other to substantially fill the mold cavity and to at partially encompass at least a portion of the attachment device; and obstructing foam entry into the plurality of female attachment portions.

In yet another of its aspects, the present invention provides a mold for producing a resilient device incorporating an attachment device comprising a plurality of attachment portions interconnected to one another by at least one connecting portion, the mold comprising:

a first mold portion and a second mold portion releasably engageable to define a mold cavity; and a retainer for the attachment device, the retainer comprising: a plurality of receptacles for receiving each of the plurality of attachment portions so as to align the attachment device in a predetermined manner, and means to retain the attachment device in place during expansion of an expandable foam composition in the mold cavity.

The present inventors have developed an attachment device, preferably a trim cover attachment device, having a combination of some or all of the following advantages:

relatively efficient to "load" on the mold, can be made of polymer to facilitate recyclability of the final product, relatively inexpensive, does not require the use of expensive and/or dangerous equipment attach the trim cover (or other element) thereto, can be used to attach a trim cover (or other element) to a foam device around a curved portion, can be easily used to provide straight-line attachment of the trim cover (or other element) to the foam device, can provide some play or give during initial and final attachment of the trim cover (or other element) to the foam device, can be used to secure a trim cover (element) to a foam device with adversely affecting other elements of the foam device (e.g., heating elements, occupant detection systems and the like), can be used facilitate original assembly and subsequent disassembly of the foam device for maintenance or any other purpose, can be deployed in relatively narrow trenches without compromising pull-out strength, and does not render the final foam product difficult to demold.

The attachment device comprises a plurality of attachment portions. The attachment portions are interconnected to one another by at least one connecting portion, preferably at least one flexible connecting portion. The attachment device is flexible in at least two independent planes. Thus, unlike the Tillner attachment device discussed above, which is flexible only in a direction perpendicular to the main plane of the connector bar, the present attachment is flexible in at least two independent planes. In most cases, the present attachment device will be flexible in more than two independent planes. Further, unlike the White attachment device discussed above, the lateral dimension of the base portion of the present attachment device allow the present attachment device to be readily adapted to use in a commercial setting (i.e., the present attachment device is much simpler to "load" or dispose in a mold). Further, by not having the receptacle portion and the base portion in the present attachment device significantly separated as shown in White, it is possible to incorporate the present attachment device in conventionally dimensioned foam elements such as vehicular seats.

Flexibility may be conferred to the attachment device in a number of different ways, such as: (i) selection of the appropriate material or materials, (ii) the geometry of the connecting portions between the attachment portions, (iii) the mode of securing the connecting portions to the attachment portions, (iv) the relative geometry of the connecting portions and the attachment portions, or (v) any combination of any of (i), (ii), (iii) and (iv).

In a preferred embodiment, flexibility may be conferred by the provision of a plurality of attachment portions, each attachment portion comprising a female attachment portion attached to a base portion. The base portion has a larger surface area than the surface area of the female attachment portion adjacent or attached thereto. The plurality of attachment portions are interconnected by one or more connecting portions, preferably one or more flexible connecting portions. The lateral dimension of the base portion is greater that the lateral dimension of the one or more connecting portions.

The present attachment device comprises a plurality of attachment portions (also referred to in some cases in this specification as female attachment portions). The precise number of such portions is not particularly restricted and depends, at least in part, on the overall dimensions and shape of the finished product. In most cases, the present attachment device, when used in a trim cover attachment application, will comprise from 2 to 10, more preferably from 4 to 8, trim cover attachment portions. Typically, a connecting portion, preferably a flexible connecting portion will interconnect adjacent pairs of attachment portions.

The present attachment system is particularly well suited to be incorporated in a resilient device such as a foam element to a trim cover may be secure and the finished product utilized as a component of a vehicular seat. While use of the present attachment device as a trim cover attachment device is highly preferred, those of skill in the art will readily appreciate the present attachment device may be used in a multitude of other applications. For example, it is possible to utilize the present attachment device to attach components other than a trim cover to a resilient body. Such other components may include heating elements, occupant detection systems, load sensors, conduits for air passageways (e.g., for use in a climate control vehicular seat), auxiliary resilient elements (e.g., multiple hardness foam elements) and like. Further, when the present attachment device is used in a vehicular seat application, it may be used to attach another to any surface of the resilient body (i.e., A-surface, B-surface, etc.). Thus, while the following description of the preferred embodiments of the present attachment device refers to a trim cover attachment device (a highly preferred application of the invention), the scope of the invention is not to be construed as limited to the use of the present attachment device solely in trim cover attachment applications.

As used throughout this specification, the term "receptacle portion" is intended to mean that portion of the attachment device which receives the attachment element of the device which is to be attached (e.g., the trim cover). Further, as used throughout this specification, the term "locking portion" is intended to mean that portion of the attachment device which retains in the attachment device the attachment element of the device which is to be attached (e.g., the trim cover).

BRIEF DESCRIPTION OF THE DRAWINGS

Embodiments of the present invention will be described with reference to the accompanying drawings in which like reference numerals denote like elements and in which:

FIG. 1 illustrates a perspective view of first embodiment of the present trim cover attachment device;

FIG. 2 illustrates an enlarged perspective view of second embodiment of the present trim cover attachment device;

FIG. 4 illustrates a perspective view of attachment of a trim cover to the trim cover attachment device illustrated in FIG. 1;

FIG. 5 illustrates a section view of attachment of a trim cover to the trim cover attachment device illustrated in FIG. 1 which has been molded into a foam element;

FIG. 8 illustrates a perspective view of a fourth embodiment of the present trim cover attachment device;

FIG. 10 illustrates a sectional view along line X-X in FIG. 9;

FIGS. 14-16 illustrate various view of use of a trim cover attachment device which is a hybrid of the trim cover attachment devices illustrated in FIG. 2 and FIG. 8.

DETAILED DESCRIPTION OF THE PREFERRED EMBODIMENTS

Figure 3:
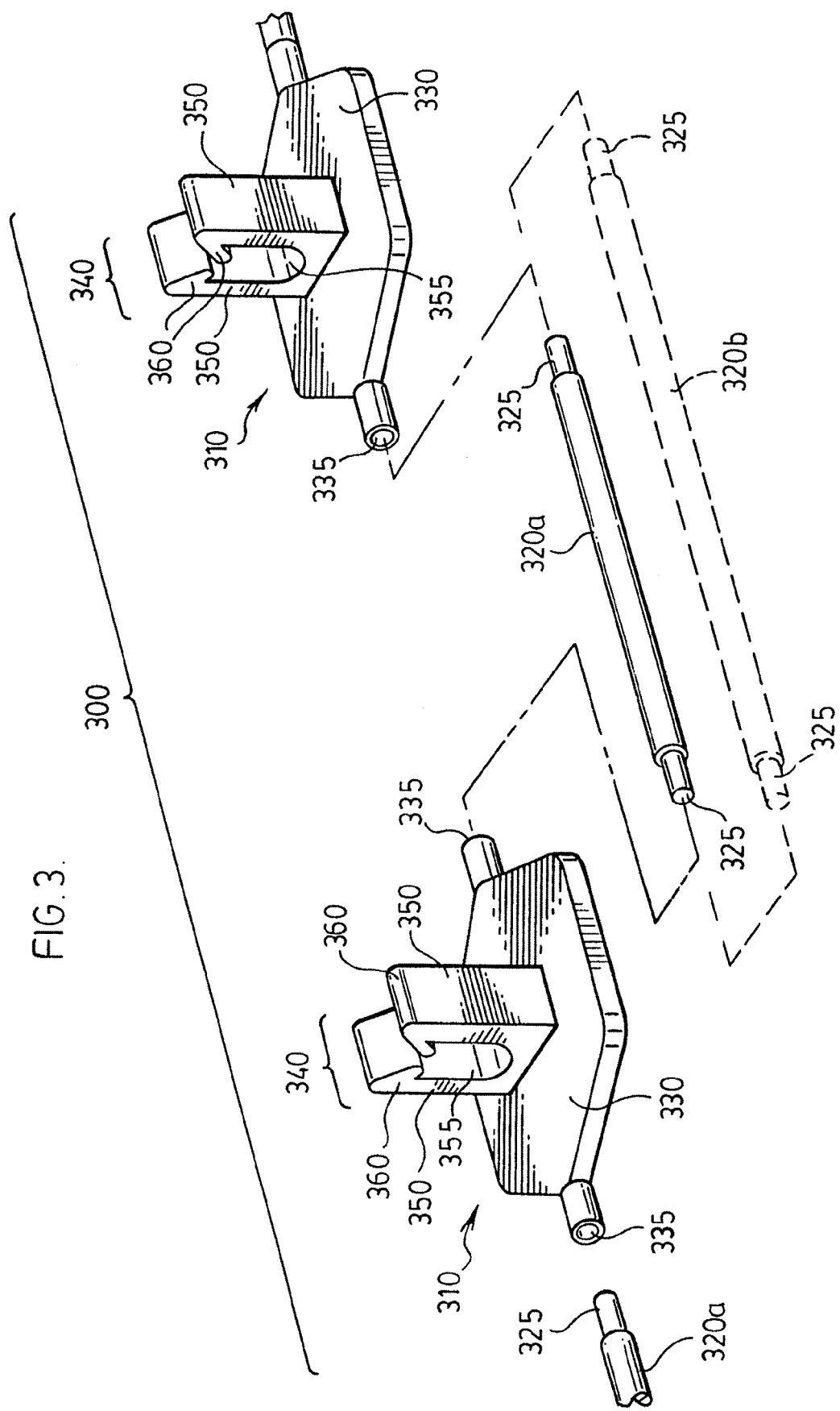
FIG. 3 illustrates an enlarged perspective view of third embodiment of the present trim cover attachment device.

With reference to FIGS. 1, 4 and 5, there is illustrated a trim cover attachment device 100. Trim cover attachment device 100 comprises a series of trim cover attachment portions 110 which are interconnected by a series of flexible portions 120. Each trim cover attachment portion 110 comprises a base 130 and a female attachment portion 140. As illustrated, base 130 has a generally rectangular shape and a larger surface area than the surface area of female attachment portion 140 which is attached to base 130.

Female attachment portion 140 is generally U-shaped and comprises a pair of generally upstanding walls 150 between which is defined a receptacle portion 155. Walls 150 are reversibly movable with respect to one another—e.g., they may be biased toward or away from each other. As illustrated, for each female attachment portion 140, walls 150 are generally mirror images of one another along an axis perpendicular to the longitudinal axis of trim cover attachment device 100. In the distal region of each wall 150 there is provided a hook 160 which acts as an element of the locking portion of attachment device 100.

As shown in FIG. 1, trim cover attachment device 100 is flexible in at least two planes. Plane #1 contains the major surface of base 130 and the flexibility of trim cover attachment device 100 in this plane is shown with reference to Arrows A. Plane #2 is orthogonal to plane #1 and the flexibility of trim cover attachment device 100 in this plane is shown with reference to Arrows B. Of course those of skill in the art will recognize that trim cover attachment device 100 may be flexible in one or more planes beyond plane #1 and plane #2. As is clearly shown in FIG. 1, the flexible portion 120 has a length in the direction of its longitudinal axis that is greater than a length of the base portion 130 in the direction of said longitudinal axis.

With reference to FIGS. 2 and 3, there are illustrated alternate embodiments to the trim cover attachment device illustrated in FIGS. 1, 4 and 5. For ease of understanding, reference numerals in FIGS. 1-5 have the same final two digits denote like elements. For example, female attachment portion 140, 240 and 340 is the same element in FIGS. 1-5.

With reference to FIG. 2, there is illustrated a trim cover attachment device 200. The principal difference between trim cover attachment device 200 and trim cover attachment device 100 illustrated in FIGS. 1, 4 and 5 is the provision of curved or non-linear flexible portion 220 in trim cover attachment device 200 (i.e., flexible portions 120 of trim cover attachment device 100 are straight sections). As illustrated in FIG. 2, flexible portion 220 is curved out of plane #1 described above (i.e., the plane which, in FIG. 2, would contain the major surface of base 230). Of course, those of skill in the art will recognize that flexible portion 220 may curved in a multitude of other directions. The attachment portions and the at least one connecting portion are integrally formed.

With reference to FIG. 3, there is illustrated a trim cover attachment device 310 having a base 330, female attachment portion 340, upstanding walls 350, hook 360, and receptacle portion 355. One difference between trim cover attachment device 310 and trim cover attachment device 100 illustrated in FIGS. 1, 4 and 5 is the provision of base 330 in trim cover attachment device 310 having a hexagonal shape and have disposed at opposed locations a pair of receptacles. Another difference between trim cover attachment device 310 and trim cover attachment device 100 illustrated in FIGS. 1, 4 and 5 is the provision of utilizing flexible portion 320a or 320b in trim cover attachment device 310. Each of flexible portions 320a and 320b comprise at opposed ends thereof a pair of pins 325. Pins 325 are size to fit snugly into receptacles 335 on base 330. As clearly shown in FIG. 3, the pins 325 are cylindrically-shaped to fit within circularly-shaped complementary receptacles 335, so that they form rotatable joints. Thus, as will be appreciated by those of skill in the art, trim cover attachment device 300 allows for onsite customization of the distance between adjacent pairs of trim cover attachment portions 310. That is, the attachment device base 330 is attachably/detachably connected to the flexible connecting portions 320a and 320b. The amount of customization can be easily controlled by the number of lengths of flexible portions 320a, 320b, etc. which are stocked. It is possible to modify pins 325 and receptacles 335 to include define a ball and socket joint (e.g., pins 325 could be modified to include the "ball" and receptacles 335 could be modified to include the "socket") once assembled. This would serve to increase flexibility of trim cover attachment device 300. With further reference to FIGS. 4-5, use of trim cover attachment device 100 to secure a trim cover 10 is illustrated. Thus, trim cover 10 comprises a cover stock material 15. As is known in the art cover stock material 15 may be made of leather, cloth, vinyl and the like. A pocket 20 is attached to cover stock material 15 via stitching 25. Disposed with pocket 20 is a rod 30. Rod 30 may be made of plastic or any other suitable material. When it is desired to attach trim cover 10 to trim cover attachment device 100, rod 30 is moved in the direction of Arrow C. The surface of pocket 20 adjacent rod 30 contacts hooks 160 of trim cover attachment device 100. With continued urging of rod 30 in the direction of Arrow C, walls 150 are biased open to allow rod 30 to clear hooks 160 and enter receptacle portion 155. Once hooks 160 are cleared by rod 30, walls 150 return to the resting state and rod 30 is received by receptacle portion 155 and retained female attachment portion 140 by hooks 160 (these elements serve as the locking portion). Those of skill in the art will recognize that rod 30 may be modified to have a non-circular cross-sectional shape or may be substituted with a strip having a barb-shaped or arrow-shaped profile.

With particular reference to FIG. 5, trim cover attachment device 100 is illustrated as incorporated in a foam element 50. As illustrated, flexible portion 120 and base 130 are embedded below a surface foam element 50, and walls 150 emerge upwardly into a trench 55 disposed in foam element 50.

Figure 6:
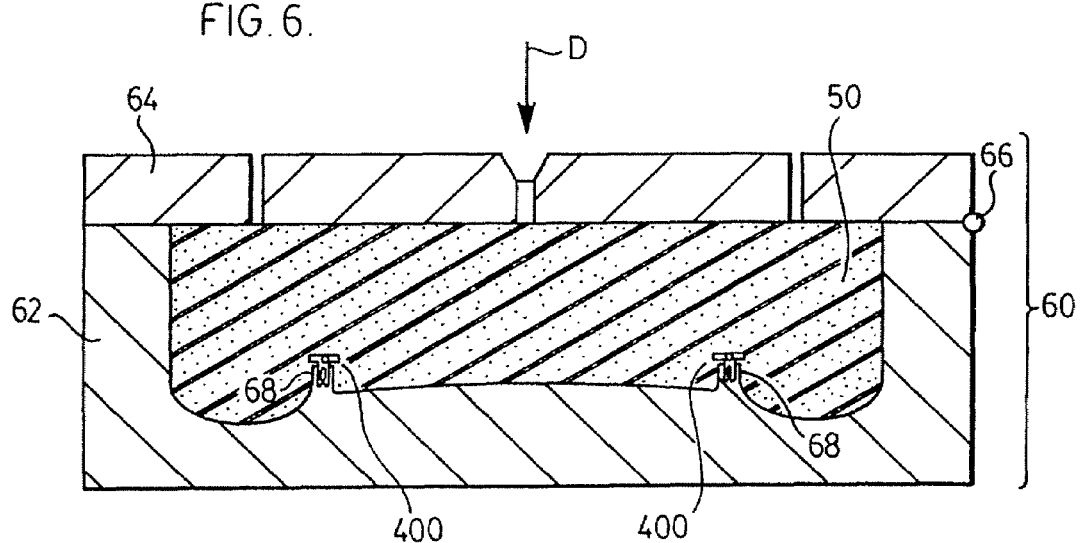
FIG. 6 illustrates a sectional view of a mold for producing a foam element incorporating the present trim cover attachment device.
Figure 7:
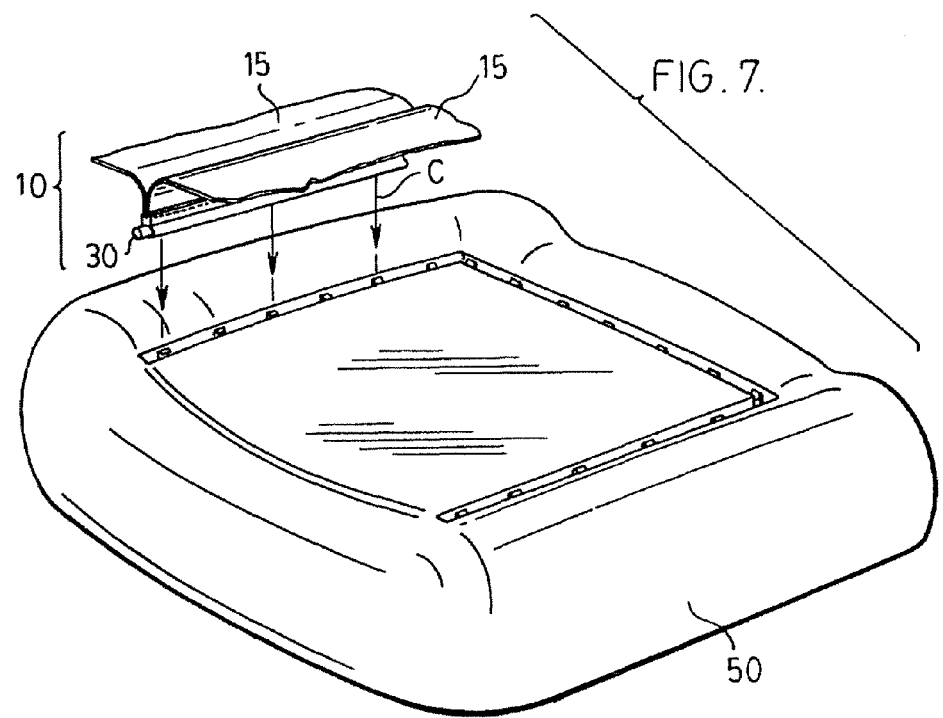
FIG. 7 illustrates a perspective view of attachment of a trim cover to the element produced in the mold of FIG. 6.

With reference to FIG. 6, there is illustrated a sectional view of a mold 60. Mold comprises a bowl 62 and a lid 64 which swings about a hinge 66. The lower surface of bowl 62 corresponds to the A-surface of the finished foam part and includes a pair of platforms 68. Platforms 68 retain trim cover attachment device 100 in a manner which will be discussed below. When it is desired to produced foam element 50, lid 64 of mold 60 is placed in the open position. Trim cover attachment devices 100 are retain in platforms 68 and a liquid foamable polymeric composition is dispensed in bowl 62. Thereafter, lid 64 is closed in the direction Arrow D and the foam composition expands to fill the mold cavity. Once expansion is complete, lid 64 is opened and foam element 50 is removed or demolded from bowl 62. Trim cover 10 may then be secured to trim cover attachment device 400 (this device will be described below) as described above with references to FIGS. 4 and 5—this is shown schematically in FIG. 7.

With reference to FIGS. 8-13, there is illustrated a highly preferred embodiment of the present trim cover attachment device, name a trim cover attachment device 400. For ease of understanding, reference numerals in FIGS. 1, 4, 5 and 8-13 have the same final two digits denote like elements. For example, base 130 and 430 are the same element in FIGS. 1-5 and 8-13, and the trim cover attachment device has base 430, female attachment portion 440, upstanding walls 450, hooks 460, and receptacle portion 455.

The principal difference between trim cover attachment device 100 and trim cover attachment device 400 is the provision of retention members 470 on the outside of walls 450 of trim cover attachment device 400.

Figure 11:
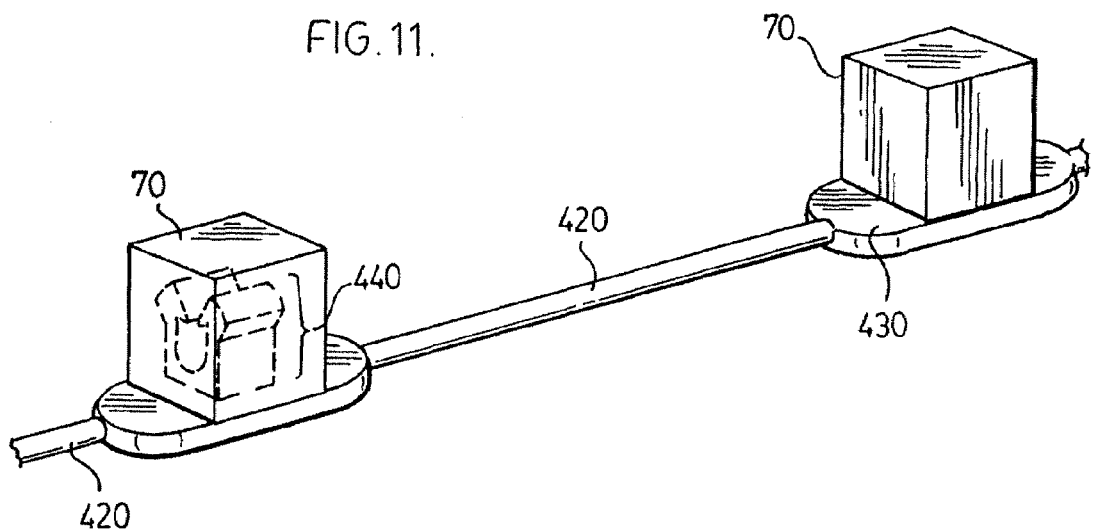
FIG. 11 illustrates a perspective view of how a portion of the trim cover attachment device illustrated in FIG. 8 would retained in a mold like the one illustrated in FIG. 6 to obviate or mitigate ingress of foam material into the trim attachment portion of the trim cover attachment device.
Figure 9:
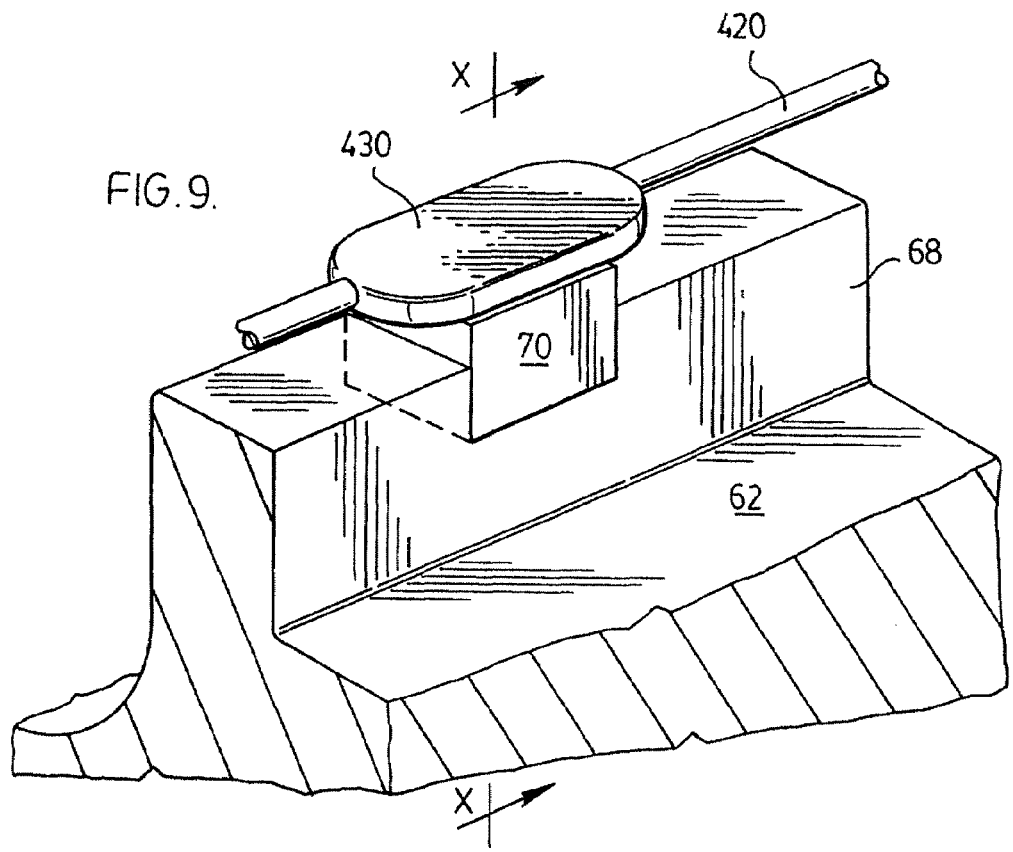
FIG. 9 illustrates an enlarged perspective view of the trim cover attachment device illustrated in FIG. 8 as it would be retained in mold like the one illustrated in FIG. 6.

Trim cover attachment device 400 is well suit to shielding of female attachment portion 440 during the foaming operation. This may be done through the use of a receptacle 70 disposed on platform 68 of bowl 62. Receptacle 70 comprises an opposed pair of lugs 72. As shown in FIG. 9, as female attachment portion 440 is pushed into receptacle 70, the distal portions of walls 450 contact lugs 720. Walls 450 are then biased toward each other until they clear lugs 72. This action serves to urge or otherwise secure base 430 against the upper surface 74 of receptacle 70 with two resultant advantages: (i) ingress of foam into receptacle 70 is obviated or mitigate thereby avoiding fouling female attachment portion 440—i.e. effective seal is formed, and (ii) trim cover attachment device 400 will not "float" or "swim" away from platform 68 as the liquid foamable polymeric compositions expands and begins to engulf flexible portions 420 and base 430. FIG. 11 illustrates a schematic of how female attachment portion 440 is encompassed by the combination of receptacle 70 and base 430.

Figure 12:
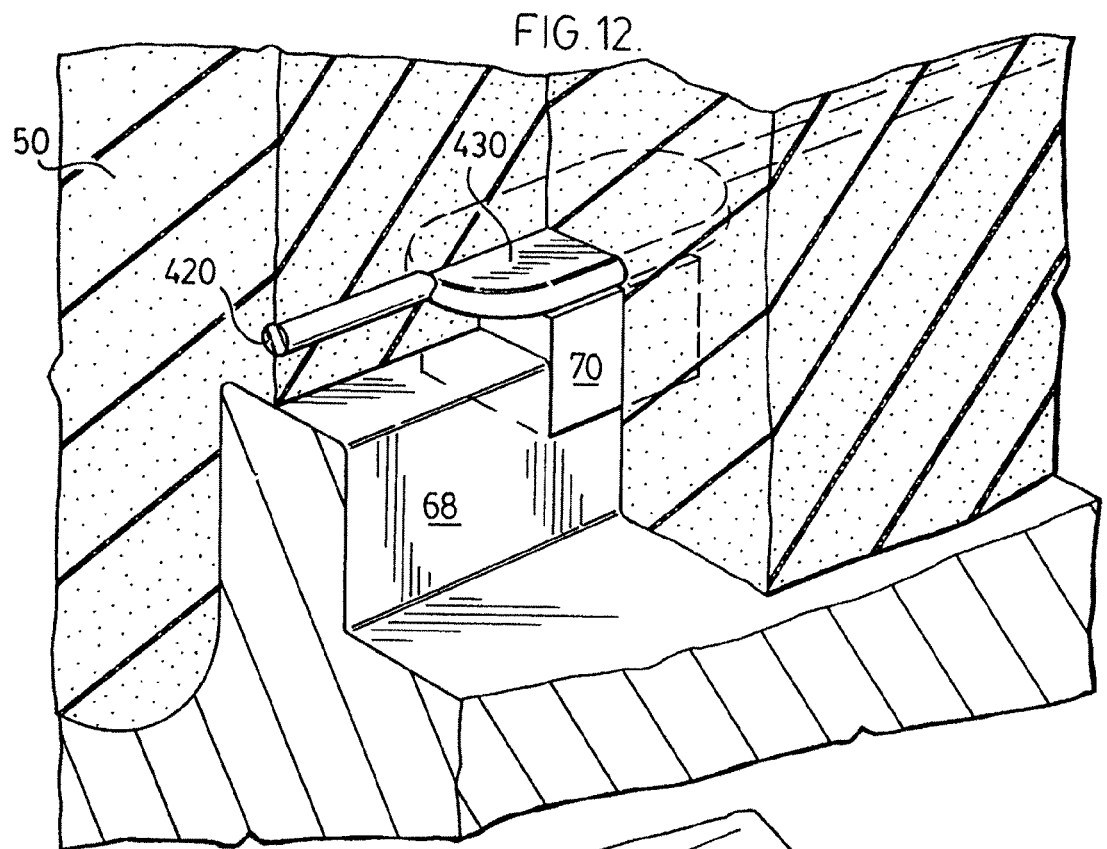
FIGS. 12 is similar to FIG. 9 with addition of a molded foam element encompassing a portion of the trim cover attachment device.
Figure 13:
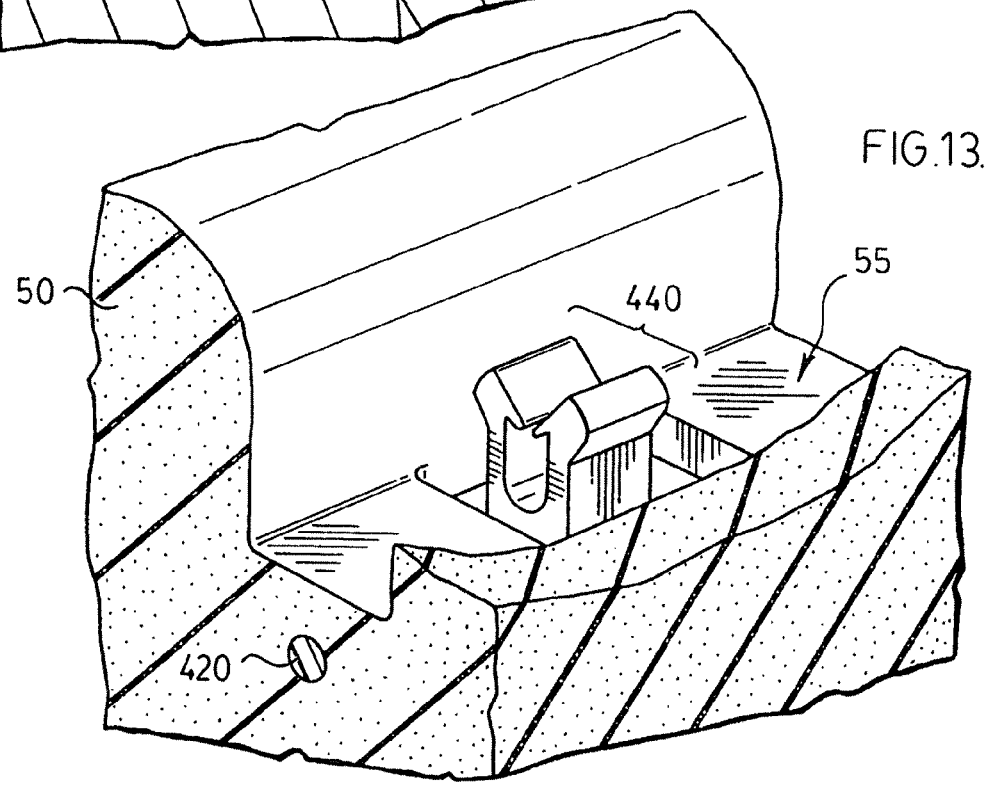
FIG. 13 illustrates the product shown in FIG. 12 after it has been demolded.

The resultant foam part 50 is shown in-mold in FIG. 12 and de-molded in FIG. 13. As illustrated in FIGS. 9 and 12, upper surface 74 of receptacle 70 is raised with respect to platform 68 of bowl 62. This facilitates having foam element 50 encompass flexible portions 420 and bases 430 of trim cover attachment device 400 thereby improving the pull-out strength of the latter.

With reference to FIGS. 14-16 there is illustrated use of a trim cover attachment device which is a "hybrid" of trim cover attachment device 200 (as to curved or non-linear flexible portions 220) illustrated in FIG. 2 and trim cover attachment device 400 (as to all elements except flexible portion 420) illustrated in FIG. 4. For ease of understanding, FIGS. 14-16 utilize the appear reference numerals to denote the respective elements from trim cover attachment device 200 and trim cover attachment device 400. The use of the "hybrid" trim cover attachment device is the same as discussed above with reference to FIGS. 8-13. One difference is that platform 69 of bowl 62 is designed to have the same height as receptacle 70 in the space between adjacent receptacles 70. The result is that bases 430 are not complete engulfed by foam element 50. Pullout is not deleteriously compromised, however, due to the presence of curved or non-linear flexible portions 220 which serve to anchor the trim cover attachment device in foam element 50.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, it is possible to modify the specific process discussed above to utilize expanded polypropylene beads (or any other expanded polymer beads) during which individual beads would be adhered together to produce a molded part without necessarily expanding individual beads. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A pre-foam vehicular seat trim cover attachment device, comprising:
   a plurality of female attachment portions interconnected to one another by at least one connecting portion, the attachment device being flexible in at least two independent planes;
   each female attachment portion comprising a receptacle portion and a base portion connected to the connecting portion, the base portion having a lateral dimension greater than a lateral dimension of the receptacle portion;
   a portion of the connecting portion being disposed in an exoplanar relationship with respect to a pair of adjacent female attachment portions that have substantially coplanar base portions.

2. The vehicular seat trim cover attachment device defined in claim 1, wherein the portion of the connecting portion is disposed on an opposite side of the substantially coplanar base portions from their respective receptacle portions.

3. The vehicular seat trim cover attachment device defined in claim 1, wherein each receptacle portion comprises a pair of generally upstanding walls.

4. The vehicular seat trim cover attachment device defined in claim 3, wherein each of the upstanding walls has a first laterally-extending portion disposed at the distal end of the upstanding wall, the first laterally-extending portion extending inward toward the other upstanding wall, the first laterally-extending portion being configured to retain the trim cover.

5. The vehicular seat trim cover attachment device defined in claim 4, wherein each of the upstanding walls has a second laterally-extending portion also disposed at the distal end of the upstanding wall, the second laterally-extending portion extending outward away from the other upstanding wall.

6. The vehicular seat trim cover attachment device defined in claim 4, wherein each first laterally-extending portion extends downward toward said base portion, each first laterally-extending portion having a first apex oriented toward the base portion.

7. The vehicular seat trim cover attachment device defined in claim 4, wherein each second laterally-extending portion extends upward away from said base portion, each second laterally-extending portion having a second apex oriented away from the base portion.

8. The vehicular seat trim cover attachment device defined in claim 1, wherein each receptacle portion comprises a substantially U-shaped cross-section.

9. The vehicular seat trim cover attachment device defined in claim 1, wherein the vehicular seat trim cover attachment device is integrally formed.

10. A pre-foam vehicular seat trim cover attachment device, comprising:
a first female attachment portion, a second female attachment portion, and a third female attachment portion;
the attachment device being flexible in at least two independent planes, each female attachment portion comprising (i) a receptacle portion, and (ii) a base portion disposed below the corresponding receptacle portion, each base portion having a lateral dimension greater than a lateral dimension of the corresponding receptacle portion;
the first female attachment portion being interconnected to the second female attachment portion by a first connecting portion;
the second female attachment portion being interconnected to the third female attachment portion by a second connecting portion; and
a portion of at least one of the first connecting portion and the second connecting portion extending below coplanar bottoms of the two base portions to which it is interconnected.

11. A vehicular seat trim cover attachment device according to claim 10, wherein a portion of both the first connecting portion and the second connecting portion extends below bottoms of the base portions of the first, second, and third female attachment portions.

12. A vehicular seat trim cover attachment device according to claim 10, wherein the first connecting portion and the second connecting portion are of different length.

13. The vehicular seat trim cover attachment device defined in claim 10, wherein each receptacle portion comprises a pair of generally upstanding walls, and wherein each of the upstanding walls has a first laterally-extending portion disposed at the distal end of the upstanding wall, the first laterally-extending portion extending inward toward the other upstanding wall, the first laterally-extending portions being configured to retain the trim cover.

14. The vehicular seat trim cover attachment device defined in claim 13, wherein each upstanding wall has a second laterally-extending portion disposed at the distal end of the upstanding wall, the second laterally-extending portion extending outward away from the other upstanding wall.

15. The vehicular seat trim cover attachment device defined in claim 10, wherein the vehicular seat trim cover attachment device is integrally formed.

16. The vehicular seat trim cover attachment device defined in claim 10, wherein the a portion of the at least one of the first connecting portion and the second connecting portion which extends below the bottoms of the two base portions to which it is interconnected, has a substantial U-shape wherein the arm portions of the U extend in a manner such that the distance between the arm portions increases as the arm portions approach the respective base portions to which they are interconnected.

17. The vehicular seat trim cover attachment device defined in claim 10, wherein the portion of the at least one of the first connecting portion and the second connecting portion which extends below the bottoms of the two base portions to which it is interconnected, extends below said two base portions at a location non-adjacent to said two base portions.

18. A pre-foam vehicular seat trim cover attachment device, comprising:
an integrally formed polymer having a first female attachment portion, a second female attachment portion, and a connecting portion that connects together the first female attachment portion and the second female attachment portion;
each of the female attachment portions including (i) a base portion having a top surface, a bottom surface, and a lateral width substantially orthogonal to a longitudinal axis of the connecting portion, and (ii) a pair of upstanding walls disposed on the top surface of the corresponding base portion, each upstanding wall having a hook portion at the distal end thereof, the hook portions being configured to retain the trim cover, a lateral width of each pair of upstanding walls being less than the lateral width of the corresponding base portion, the bottom surfaces being coplanar; and
the connecting portion having at least one section which extends below the coplanar bottom surfaces of the base portions to which it is attached.

19. A vehicular seat trim cover attachment device according to claim 18, wherein the at least one section of the connecting portion comprises a substantial U-shape wherein the arm portions of the U extend in a manner such that the distance between the arm portions increases as the arm portions approach the respective base portions to which they are interconnected.

20. A vehicular seat trim cover attachment device according to claim 19, wherein the U-shape is disposed substantially in the middle of the connecting portion.

21. A vehicular seat trim cover attachment device according to claim 18, wherein each upstanding wall hook portion extends inward toward the opposite upstanding wall.

22. A vehicular seat trim cover attachment device according to claim 18, wherein the connecting portion is connected to a side of each base portion substantially between each base's top surface and bottom surface.

23. A pre-foam seat trim cover attachment apparatus, comprising:
- a connecting portion having a (i) longitudinal axis and (ii) a lateral width that is less than its longitudinal length;
- a first female attachment device having a first base with a lateral width greater than the connecting portion lateral width, the first base having a first top surface, a first bottom surface, and a first side surface, the first female attachment device also having a first pair of upstanding walls disposed on the first top surface, each upstanding wall having a hook at its distal end, each hook extending toward the opposite upstanding wall so as to engage the trim cover, the first pair of upstanding walls presenting a first U-shape whose outer walls have a lateral width greater than the connecting portion lateral width but less than the first base lateral width, inner walls of said first U-shape having a lateral width therebetween greater than the lateral width of the connecting portion; and
- a second female attachment device having a second base with a lateral width greater than the connecting portion lateral width, the second base having a second top surface, a second bottom surface, and a second side surface, the second female attachment device also having a second pair of upstanding walls disposed on the second top surface, each upstanding wall having a hook at its distal end, each hook extending toward the opposite upstanding wall so as to engage the trim cover, the second pair of upstanding walls presenting a second U-shape whose outer walls have a lateral width greater than the connecting portion lateral width but less than the second base lateral width, inner walls of said second U-shape having a lateral width therebetween greater than the lateral width of the connecting portion, said second bottom surface being coplanar with said first bottom surface;
- a portion of the connecting portion being disposed below said first bottom surface and below said second bottom surface.

24. Vehicular seat trim cover attachment apparatus according to claim 23, wherein the connecting portion connects to the first side surface of the first base and to the second side surface of the second base.

25. A foam seat element having molded there in the vehicular seat cover attachment device comprising:
- a plurality of female attachment portions interconnected to one another by at least one connecting portion, the attachment device being flexible in at least two independent planes;
- each female attachment portion comprising a receptacle portion and a base portion connected to the connecting portion, the base portion having a lateral dimension greater than a lateral dimension of the receptacle portion;
- a portion of the connecting portion being disposed in an exoplanar relationship with respect to a pair of adjacent female attachment portions that have substantially coplanar base portions.

* * * * *